United States Patent
Koo (10) Patent No.: US 9,401,626 B2
(45) Date of Patent: Jul. 26, 2016

(54) BATTERY, POWER SUPPLY APPARATUS AND ELECTRONIC APPARATUS

(71) Applicant: SAMSUNG Electronics Co., Ltd., Suwon-si, Gyeonggi-do (KR)

(72) Inventor: Ja-goun Koo, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 381 days.

(21) Appl. No.: 14/150,933

(22) Filed: Jan. 9, 2014

(65) Prior Publication Data

US 2014/0197690 A1    Jul. 17, 2014

(30) Foreign Application Priority Data

Jan. 17, 2013  (KR) .......... 10-2013-0005393

(51) Int. Cl.
*H02J 9/06* (2006.01)
*G06F 1/30* (2006.01)
*G06F 1/26* (2006.01)

(52) U.S. Cl.
CPC . *H02J 9/061* (2013.01); *G06F 1/30* (2013.01); *G06F 1/263* (2013.01); *Y10T 307/625* (2015.04)

(58) Field of Classification Search
CPC ....................................................... H04B 1/1607
USPC ............................................................ 307/23
See application file for complete search history.

(56) References Cited

U.S. PATENT DOCUMENTS 5,717,306 A * 2/1998 Shipp .................... H01M 10/48
                                                                     307/125

* cited by examiner

*Primary Examiner* — Robert Deberadinis
(74) *Attorney, Agent, or Firm* — Staas & Halsey LLP (57) ABSTRACT

An electronic apparatus including an RT/CMOS DATA logic unit which stores Real-Time Clock information and CMOS information, and a battery having a power terminal to supply main power used in the electronic apparatus and a signal terminal for data communication with the electronic apparatus, and when the main power is turned off, supplies power to the RT/CMOS DATA logic unit through the signal terminal to maintain operations of the RT/CMOS DATA logic unit.

20 Claims, 8 Drawing Sheets

BATTERY, POWER SUPPLY APPARATUS AND ELECTRONIC APPARATUS

CROSS-REFERENCE TO RELATED APPLICATIONS

This application claims priority from Korean Patent Application No. 2013-0005393, filed on Jan. 17, 2013, the disclosure of which is incorporated herein by reference in its entirety.

BACKGROUND OF THE INVENTION

1. Field of the Invention

Methods and apparatuses consistent with the exemplary embodiments of the present general inventive concept relate to a battery, power supply apparatus, and electronic apparatus, and more particularly to a battery which supplies power to an RT/CMOS DATA logic unit which stores real-time clock information and CMOS information, a power supply apparatus, and an electronic apparatus thereof.

2. Description of the Related Art

Due to the development of electronic technologies, various types of electronic apparatuses are being developed and supplied. Especially, electronic apparatuses which have its basis on excellent IT technologies, such as high-tech desktop computers, notebook computers, smart phones, and tablet computers etc. are being provided.

Such an electronic apparatus has an RT/CMOS DATA logic unit and a battery for supplying power to an RT/CMOS DATA logic unit. Herein, the RT/CMOS DATA logic unit stores real time clock information, which is information on the current weather and time, and CMOS information (user information and other information such as hardware (HW) setting, software (SVV) setting, and password etc.).

In addition, the battery for supplying power to the RT/CMOS logic unit is embodied as a low volume battery (for example, a coin type CR2032 cell), and supplies power to the RT/CMOS DATA logic unit to maintain the real time clock information and CMOS information with the main power of the electronic apparatus turned off.

As such, a conventional portable electronic apparatus such as a notebook computer, tablet computer, and smart phone not only has a main battery, which supplies main power, but also an additional battery to supply power to the RT/CMOS DATA logic unit. In addition, a desktop computer also as an additional battery to supply power to the RT/CMOS DATA logic unit.

Therefore, there was a problem of additional costs incurring due to adding an additional battery to supply power to the RT/CMOS DATA logic unit and adding a connector of a battery to supply power to the RT/CMOS DATA logic unit.

In addition, additional space is required for adding an additional battery to supply power to the RT/CMOS DATA logic unit and adding a connector of the additional battery to supply power to the RT/CMOS DATA logic unit, thereby causing negative consequences to thin and light designing.

SUMMARY OF THE INVENTION

The present general inventive concept provides a battery which supplies power to an RT/CMOS DATA logic unit using a battery which supplies main power to an electronic apparatus, and a power supply apparatus and electronic apparatus thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electronic apparatus including an RT/CMOS DATA logic unit to store Real-Time Clock information and CMOS information; and a battery including a power terminal to supply main power used in the electronic apparatus and a signal terminal for data communication with the electronic apparatus, and, when the main power is turned off, the battery supplies power to the RT/CMOS DATA logic unit through the signal terminal to maintain operations of the RT/CMOS DATA logic unit.

In addition, the electronic apparatus may further include a power supply controller to enable power supplied from the power terminal or the signal terminal to be provided to the RT/CMOS DATA logic unit, according to on/off state of the main power.

In addition, the power supply controller may provide the power supplied from the signal terminal to the RT/CMOS DATA logic unit when the main power is turned off, and provide the power supplied from the power terminal to the RT/CMOS DATA logic unit when the main power is turned on.

Furthermore, the power supply controller may include a first diode of which an anode end is connected to a line connected to the signal terminal and of which a cathode end is connected to a line connected to the RT/CMOS DATA logic unit; and a second diode of which an anode end is connected to a line connected to the power terminal and of which a cathode end is connected to a line connected to the RT/CMOS DATA logic unit.

In addition, the battery may further include at least one battery cell; a pull up resistance to provide power supplied from the at least one battery cell to the signal terminal; a switching device connected to the at least one battery cell; and a battery manager to control the switching device to control supply of main power through the power terminal, and controls the switching device to supply power to the RT/CMOS DATA logic unit through the signal terminal or to perform the data communication.

Furthermore, the resistance may be provided inside the battery manager.

In addition, the battery may be an inside pack battery.

In addition, the data communication between the battery and the electronic apparatus may be performed using an I2C (Inter Integrated Circuit) communication method.

The foregoing and/or other features and utilities of the present general inventive concept may also be achieved by providing a battery used in an electronic apparatus including at least one battery cell; a power terminal to supply main power to the electronic apparatus; a signal terminal to perform data communication between the battery and the electronic apparatus or to supply power to an RT/CMOS DATA logic unit which stores Real-Time Clock information and CMOS information; a pull up resistance to provide power supplied from the at least one battery cell to the signal terminal; and a battery manager to supply power to the RT/CMOS DATA logic unit through the signal terminal when the main power is turned off, and controls the battery to perform data communication between the battery and the electronic apparatus through the signal terminal when the main power is turned on.

In addition, the resistance may be provided inside the battery manager.

The foregoing and/or other features and utilities of the present general inventive concept may also be achieved by providing a battery used in an electronic apparatus including at least one battery cell; a first power terminal to supply main power to the electronic apparatus; and a second power terminal to supply power to an RT/CMOS DATA logic unit which stores Real-Time Clock information and CMOS information; wherein the second terminal may be a terminal which supplies power to the RT/CMOS DATA logic unit to maintain operations of the RT/CMOS DATA logic unit regardless of on/off state of the main power.

The foregoing and/or other features and utilities of the present general inventive concept may also be achieved by providing a power supply apparatus to supply power to an RT/CMOS DATA logic unit which stores Real-Time Clock information and CMOS information may include a battery to store power; and a power supply controller to control power supply to the RT/CMOS DATA logic unit, using power supplied from the battery, wherein the battery may include a signal terminal to perform data communication between the battery and the electronic apparatus or to supply power to the RT/CMOS DATA logic unit, and a power terminal to supply main power to the electronic apparatus, and the power supply controller may enable power supplied from the power terminal or the signal terminal to be provided to the RT/CMOS DATA logic unit, according to on/off state of the main power.

In addition, the power supply controller may provide the power supplied from the signal terminal to the RT/CMOS DATA logic unit when the main power is turned off, and provide the power supplied from the power terminal to the RT/CMOS DATA logic unit when the main power is turned on.

According to various exemplary embodiments of the present general inventive concept, it is possible to use a battery supplying main power to an electronic apparatus to provide power to an RT/CMOS DATA logic unit, thereby removing the requirement of an additional battery to supply power to the RT/CMOS DATA logic unit and a connector regarding the additional battery to supply power to the RT/CMOS DATA logic unit. Accordingly, it is possible to realize a saving effect of material costs and a saving effect of space.

The foregoing and/or other features and utilities of the present general inventive concept may also be achieved by providing an electronic apparatus comprising a battery having a power terminal to output a main power, and a signal terminal to selectively output data and a sub-power.

The battery may further comprise one or more battery cells to generate a battery power, and a voltage level reducer to reduce a voltage level of the battery power to output the sub-power.

The one or more battery cells may generate a battery power such that the one or more battery cells are selectively connected to either the power terminal or the signal terminal.

The battery may further comprise a battery manager to selectively supply the main power to the power terminal and the sub-power to the signal terminal.

The battery may exclusively output one of the data and the sub-power.

The battery may exclusively output one of the main power and the sub-power.

The battery may simultaneously output the main power and the data.

The data may comprise data representing a state of the battery.

The battery manager may control a switching device to selectively supply the main power to the power terminal and the sub-power to the signal terminal.

The switching device may comprise a MOSFET to perform switching operations.

The voltage level reducer may comprise a pull up resistance having one end connected to the one or more battery cells and its other end connected to the signal terminal.

The voltage level reducer may be disposed within the battery manager as an Application Specific Integrated Circuit (ASIC) to reduce a voltage level of the battery power to output the sub-power.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
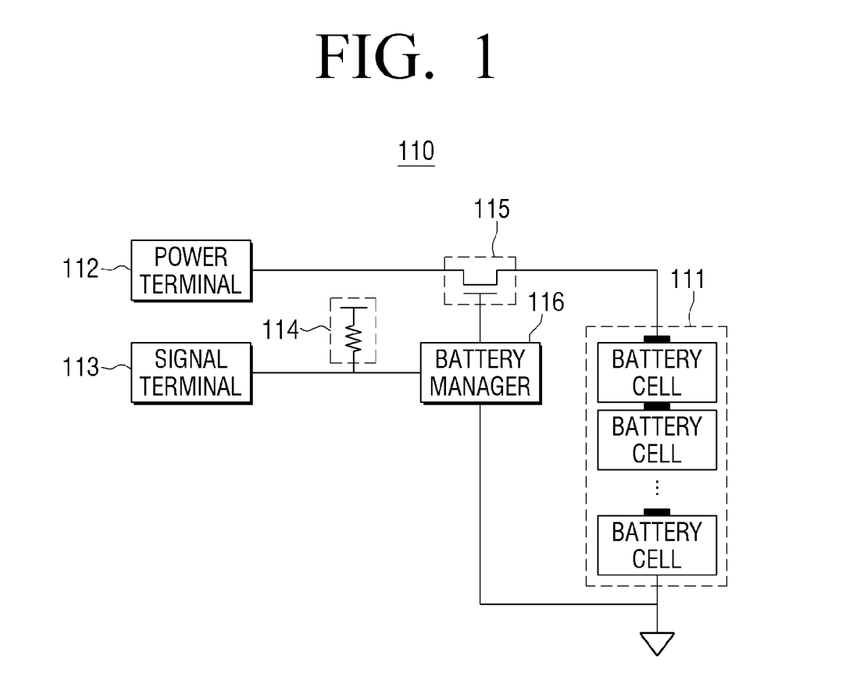
FIG. 1 is a block diagram illustrating a battery according to first exemplary embodiment of the present general inventive concept.

FIG. 1 is a block diagram illustrating a battery 110 according to a first exemplary embodiment of the present general inventive concept. With reference to FIG. 1, a battery 110 according to a first exemplary embodiment of the present general inventive concept includes at least one of an entire or portion of battery cell 111, power terminal 112, signal terminal 113, pull up resistance 114, switching device 115, and a battery manager 116. Herein, the battery 110 may be used to supply power to a portable electronic apparatus such as a notebook computer, tablet computer, and smart phone. In addition, the battery 110 may be an exterior pack battery designed to be easily attached/detached or an interior pack battery designed so as not to be attached/detached. However, desirably, the battery 110 according to the first exemplary embodiment of the present general inventive concept may be an interior pack battery.

Figure 2:
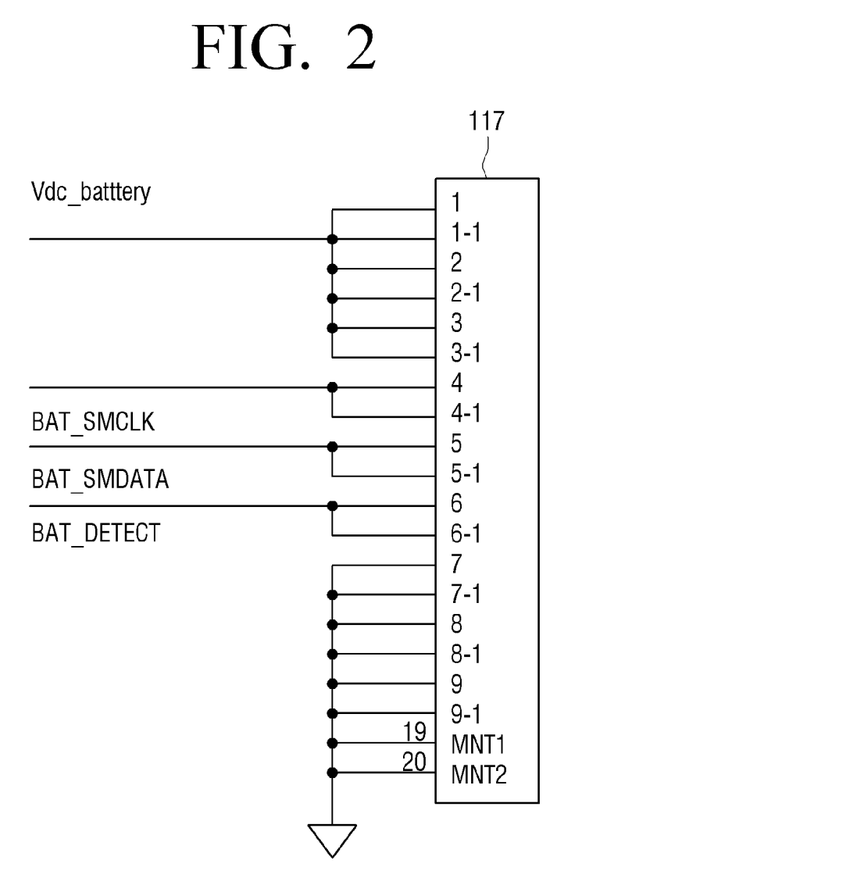
FIG. 2 is a view illustrating a battery connector to which a battery of FIG. 1 accesses.

FIG. 2 is a view illustrating a battery connector 117 to which a battery 110 according to FIG. 1 accesses. Herein, the battery connector 117 may be an apparatus provided in the electronic apparatus to access the battery, and may have as many terminals (1, 1-1~MINT1, MINT2) as the number batteries to access the batteries.

Hereinafter is specific explanation on the battery 110 according to the first exemplary embodiment of the present general inventive concept.

The battery cell 111 is a cell which may be repeatedly used through a discharging process, where chemical energy is converted into electrical energy, and a charging process where electrical energy is converted into chemical energy. Accordingly, the battery cell 111 may supply charged DC power.

The power terminal 112 is a terminal which supplies main power (Vdc_battery) to the electronic apparatus. Herein, the power terminal 112 may consist of at least one terminal. In a case where the power terminal 112 consists of a plurality of terminals, each terminal of the plurality of terminals may access 1, 1-1, 2, 2-1, 3, 3-1 terminals of the connector 117.

The signal terminal 113 is a terminal used to perform data communication (BAT_SMCLK, BAT_SMDATA, BAT_DETECT) between the battery 110 and the electronic apparatus or to supply power to the RT/CMOS DATA logic unit which stores real-time clock information and CMOS information. Herein, data communication between the battery 110 and electronic apparatus may be performed by receiving/transmitting a signal regarding battery attachment/detachment (BAT_DETECT), a signal regarding the charged state of the battery (BAT_SMDATA), and a clock signal (BAT_SMCLK). Such data communication between the battery 110 and electronic apparatus may be performed using a I2C (Inter Integrated Circuit) communication method. Meanwhile, the signal terminal 113 may consist of at least one terminal. In a case where the signal terminal 113 consists of a plurality of terminals, each of the plurality of terminals may access 4, 4-1, 5, 5-1, 6, 6-1 terminals of the connector 117.

Meanwhile, a voltage and current required by the RT/CMOS DATA logic unit 156 may differ depending on models of various manufacturers, but in case of the RT/CMOS DATA logic unit in general, the required electricity is very low, and thus there is no problem of supplying power through an existing signal terminal.

An earthing terminal (not illustrated) is a terminal to ground the battery 110. Herein, the earthing terminal (not illustrated) may consist of at least one terminal. In a case where the earthing terminal (not illustrated) consists of a plurality of terminals, each of the plurality of terminals may access 7, 7-1, 8, 8-1, 9, 9-1, MNT1, MNT2 terminals of the battery connector 117.

A pull up resistance 114 performs a function of providing power supplied from at least one battery cell 111 to the signal terminal 113. More specifically, the resistance 114 may have one end thereof connected to at least one battery cell 111, and its other end connected to the signal terminal 113, to perform the function of the pull up resistance.

The switching device 115 performs a switching operation according to a control by the battery manager 116 to be explained hereinafter. Herein, the switching device 115 may be embodied as an MOSFET which performs switching operations.

The battery manager 116 may control the switching device 115 to control provision of main power through the power terminal 112. More specifically, in a case where main power must be supplied, the battery manager 116 may control the switching device 115 to supply main power through the power terminal 112.

Herein, cases where main power must be supplied may include all cases where the main power (Vdc_battery) must be supplied through the power terminal 112 as in a power-on mode corresponding to S0 state, which is a general term in the computer field.

In addition, in a case where main power need not be provided, the battery manager 116 may control the switching device 115 so that main power is not supplied through the power terminal 112. Further, the battery manager 116 may control the switching device 115 to supply power through the signal terminal.

Herein, cases where main power may not be supplied may include the power-off mode corresponding to S5 state, which is a general term in the computer field, a shut down state which is entered when the residual of the battery is less than the predetermined 3-5% at a power-on state, or when main power (Vdc_battery) need not be supplied through the power terminal 112 as in S4 power saving mode, which is a general term in the computer field.

Meanwhile, the battery manager 116 may control the switching device 115 so that the battery 110 supplies power to the RT/CMOS DATA logic unit or perform data communication through the signal terminal 113. More specifically, when the main power is turned on, the battery manager 116 may control the switching device 115 so that the battery 110 performs data communication through the signal terminal 113. In addition, when the main power is turned off, the battery manager 116 may control the switching device 115 so that the battery 110 supplies power to the RT/CMOS DATA logic unit through the signal terminal 113. Herein, power supply or data communication through signal terminal 113 may be performed using voltage supplied from at least one battery cell 111 through the pull up resistance 114.

Meanwhile, although omitted in FIG. 1, the battery 110, according to the first exemplary embodiment of the present general inventive concept, may include a charging circuit (not illustrated) for charging external power applied through an external AC adaptor.

Figure 3:
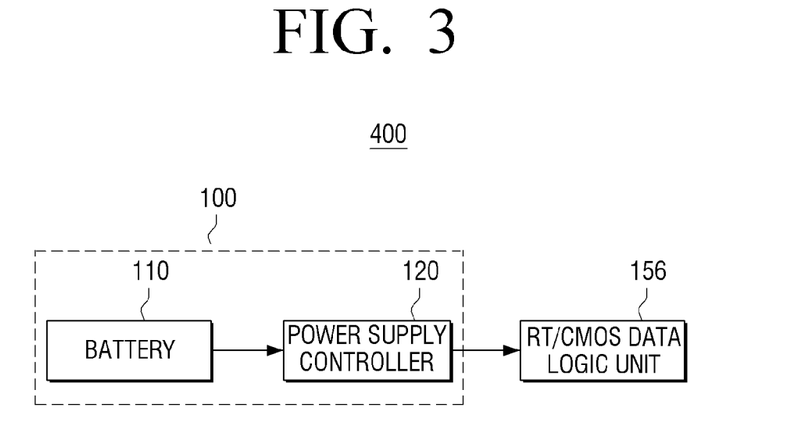
FIG. 3 is a block diagram illustrating an electronic apparatus having a battery according to FIG. 1.
Figure 4:
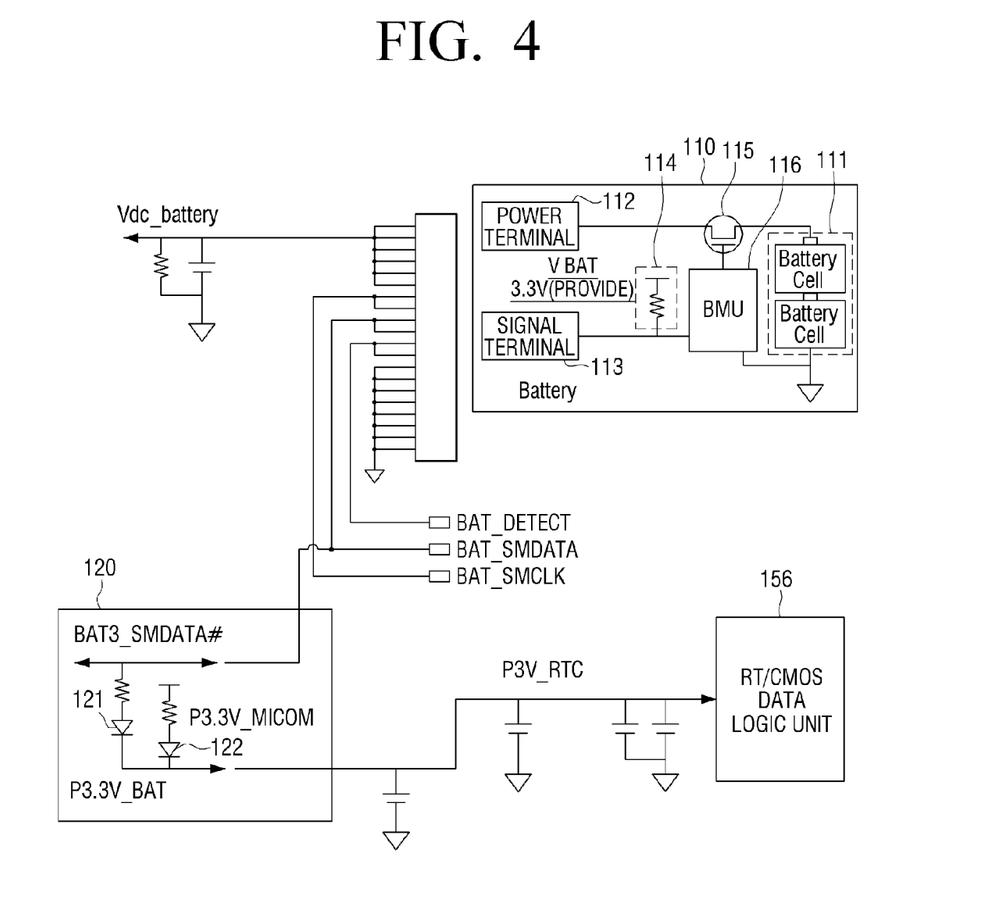
FIG. 4 is a circuit diagram specifically illustrating an electronic apparatus of FIG. 3.

FIG. 3 is a block diagram illustrating an electronic apparatus having a battery according to FIG. 1. FIG. 4 is a circuit diagram specifically illustrating an electronic apparatus according to FIG. 3. With reference to FIGS. 3 and 4, the electronic apparatus 400 includes an entire or portion of the RT/CMOS DATA logic unit 156. Herein, the power supply apparatus 100 may include a battery 110 and a power supply controller 120.

Hereinafter is a detailed explanation of the power supply apparatus 100 and electronic apparatus 400 according to an exemplary embodiment of the present general inventive concept with reference to FIGS. 3 and 4. However, the battery 110 was specifically explained in FIGS. 1 and 2, and, thus, specific explanation of the battery 110 is omitted.

The battery 110 supplies the charged power to the electronic apparatus 400.

The RT/CMOS DATA logic unit 156 stores the Real Time Clock information, which is information regarding the current date and time, and CMOS information (user information such as HW setting, SW setting, and Password etc., and other information etc.). Herein, the RT/CMOS DATA logic unit 156 may be embodied as one of functional blocks inside an ASIC (Application Specific Integrated Circuit). However, the RT/CMOS DATA logic unit 156 is not limited thereto but may be embodied as one separated single chip.

The power supply controller 120 controls the power supply of all components which configure the electronic apparatus 400, such as a CPU (Central Processing Unit), volatile memory, nonvolatile memory, and main board chip set etc.

Such a power supply controller 120 may be embodied to include the circuit diagram 120 illustrated in FIG. 4, disposed inside a conventional embedded controller of prior art. That is, the power supply controller 120 illustrated in FIG. 4 is a configuration added to control power supply regarding the RT/CMOS DATA logic unit 156, illustrating a portion of the embedded controller which controls the power supply regarding the electronic apparatus 400. Hereinafter is an explanation mainly focusing on the power supply controller 120 which controls the power supply to the RT/CMOS DATA logic unit 156 for convenience of explanation.

The power supply controller 120 may use the power supplied from the battery 110 to control power supply to the RT/CMOS DATA logic unit 156. More specifically, according to on/off of the main power (Vdc_battery) regarding the electronic apparatus 400, it is possible to control the power supply controller 120 so that the power supplied from the power terminal 112 or signal terminal 113 is provided to the RT/CMOS DATA logic unit 156.

Herein, the power supply controller 120 may consist of a circuit as in FIG. 4. That is, the power supply controller 120 may include a first diode 121 of which an anode end is connected to a line connected to the signal terminal 113 through at least one resistor and of which a cathode end is connected to a line connected to the RT/CMOS DATA logic unit 156; and a second diode 122 of which an anode end is connected to a line connected to the power terminal 112 through at least one resistor and of which a cathode end is connected to a line connected to the RT/CMOS DATA logic unit 156.

Accordingly, the power supply controller 120 may operate in accordance with Table 1, as shown below.

TABLE 1

|  | Vdc_battery | P3.3V_MICOM | P3.3V_BAT | P3V_RTC |
|---|---|---|---|---|
| Main power on (case 1) | on | on | off | P3.3V_MICOM (I2C working) |
| Main power off (case 2) | off | off | on | P3.3V_BAT (I2C not working) |
| Main power off (A state where the battery residual is less than the predetermined residual, the battery cell voltage being at least a certain voltage) (case 3) | off | off | on | P3.3V_BAT (ex: V_BAT: 3.0 V or above) (based on battery cell voltage) |
| Main power off (A state where the battery residual is or less than the predetermined residual, the battery cell voltage being or below a certain voltage) (case 4) | off | off | off | RTC fail (ex: V_BAT: 3.0 V or below) (based on battery cell voltage) |

That is, in a case where main power regarding the electronic apparatus 400 must be turned on (CASE 1), main power is supplied through the power terminal 112 of the battery 110 (Vdc_battery: ON), and data communication between the battery 110 and electronic apparatus 400 is performed through the signal terminal 113 of the battery 110 (BAT3_SMDATA#: I2C working). In this case, when main power supplied in the power terminal 112 is applied to the second diode 122 of the power supply controller 120 (Vdc_battery), the second diode 122 may provide the applied power to the RT/CMOS DATA logic unit 156 (P3.3V_MICOM: ON).

Meanwhile, in this case, reverse bias is generated in the first diode 121, not interrupting the data communication between the battery 110 and the electronic apparatus 400 through the signal terminal 113 (BAT3_SMDATA#: I2C working). That is, a data signal between the battery 110 and the electronic apparatus 400, transceived through the signal terminal 113 (BAT3_SMDATA#), is not applied to the first diode 121 (P3.3V_BAT: OFF), but communication is performed through the embedded controller through the power supply controller 120.

In addition, when main power regarding the electronic apparatus 400 must be turned off (CASE 2), the supply of main power through the power terminal 112 of the battery 110 is turned off (Vdc_battery: OFF), and power regarding the RT/CMOS DATA logic unit 156 is supplied through the signal terminal 113 of the battery 110. In this case, when the power supplied in the signal terminal 113 is applied to the first diode 121 of the power supply controller 120, the first diode 121 may provide the applied power to the RT/CMOS DATA logic unit 156 (P3.3V_BAT: ON).

Meanwhile, according to OFF of the main power (Vdc_battery), a reverse bias is generated and the second diode 122 is turned off (P3.3V_MICOM: OFF).

In addition, in a case where the residual of the battery 110 is not above the predetermined residual (for example, when the residual of the battery is 3-5%), and the battery cell 111 voltage V_BAT is or above a predetermined voltage (for example, 3V or above), the electronic apparatus 400 is shut down or entered into S4 power saving mode to protect the normal operation state of the system. In this case (CASE 3), supply of main power through the power terminal 112 of the battery 110 is turned off (Vdc_battery: OFF), and power regarding the RT/CMOS DATA logic unit 156 is supplied through the signal terminal 113 of the battery 110.

That is, current needed in the RT/CMOS DATA logic unit 156 may differ according each model of various manufacturers, but in general, the current used in RT/CMOS DATA logic unit 156 is a low value of a several uA, and thus even when the residual of the battery 110 is not above the predetermined residual, when the battery cell 111 voltage is or above the predetermined voltage, power supply for the RT/CMOS DATA logic unit 156 is possible.

In this case, when the power supplied from the signal terminal 113 is applied to the first diode 121 of the power supply controller 120, the first diode 121 may provide the applied power to the RT/CMOS DATA logic unit 156 (P3.3V_BAT: ON).

Meanwhile, according to OFF of the main power (Vdc_battery), a reverse bias is generated, and the second diode 122 is turned off (P3.3V_MICOM: OFF).

In addition, when the residual of the battery 110 is not above the predetermined residual (for example, when the residual of the battery is 3-5%), and the battery cell 111 voltage (V_BAT) is not above the predetermined voltage (for example, not above 3V), the electronic apparatus 400 is shut down or entered into S4 power saving mode to protect normal operation state of the system. In this case (CASE 4), main power supply through the power terminal 112 of the battery is shut off (Vdc_battery: OFF), and power supply regarding the RT/CMOS DATA logic unit 156 cannot satisfy the conditions (as in Table 1, when the battery cell 111 voltage (V_BAT) must be at or above a predetermined voltage, but fails to satisfy this). Accordingly, it becomes unable to maintain operations of the RT/CMOS DATA logic unit 156.

In this case, when the system is turned on (ON) through AC application or battery charge etc., the electronic apparatus 400 may automatically synchronize real time clock information through online.

Meanwhile, the circuit diagram of FIG. 4 illustrates that power is supplied to the RT/CMOS DATA logic unit 156 using the BAT_SMDATA signal terminal, but it is not limited thereto. Therefore, depending on embodiments, the system may be embodied to supply power to the RT/CMOS DATA logic unit 156 using the BAT_DETECT signal terminal or the BAT_SMCLK signal terminal. Otherwise, the system may be embodied to supply power to the RT/CMOS DATA logic unit 156 using at least one signal terminal of the BAT_SMDATA signal terminal, BAT_DETECT signal terminal, and BAT_SMCLK signal terminal.

Meanwhile, according to various exemplary embodiments of the present general inventive concept, it is possible to remove the requirement of an additional battery for supplying power to the RT/CMOS DATA logic unit and the connector of the additional battery for supplying power to the RT/CMOS DATA logic unit by using the battery supplying main power to the electronic apparatus to supply power to the RT/CMOS DATA logic unit. Accordingly, it is possible to achieve saving effect of material costs and saving effect of space.

Figure 5:
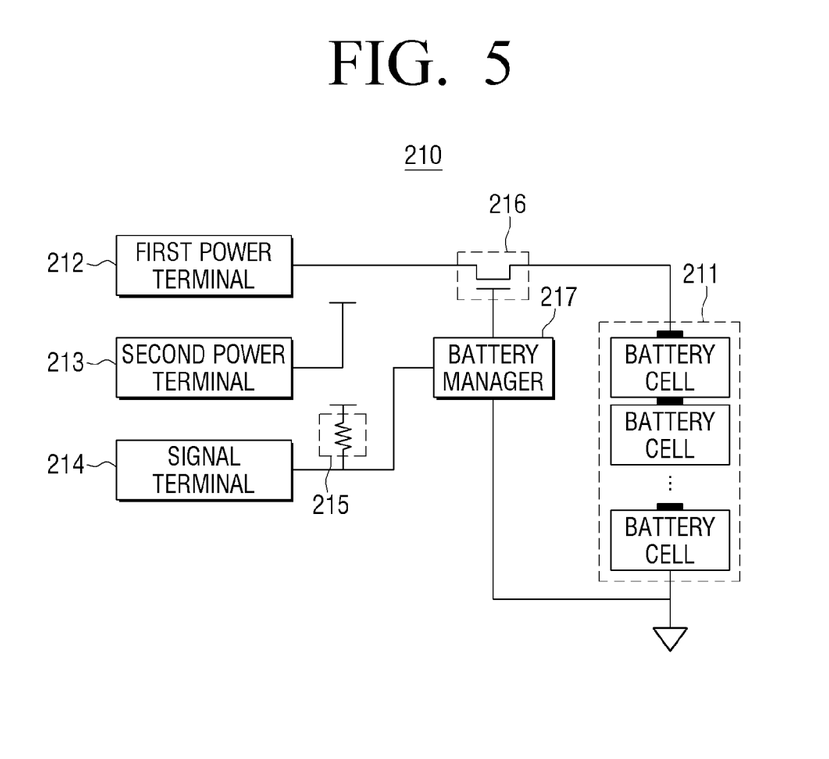
FIG. 5 is a block diagram illustrating a battery according to a second exemplary embodiment of the present general inventive concept.

Hereinafter is a detailed explanation on the battery 210 according to a second exemplary embodiment of the present general inventive concept with reference to FIGS. 5 and 6. With reference to FIG. 5, the battery 210, according to the second exemplary embodiment of the present general inventive concept, includes at least one of an entire or portion of a battery cell 211, first power terminal 212, second power terminal 213, signal terminal 214, pull up resistance 215, switching device 216, and battery manager 217. Herein, the battery 210 may be used to supply power to a portable electronic apparatus such as a notebook computer, tablet computer, and smart phone. In addition, the battery 210 may be an external pack battery designed for easy attachment/detachment or an internal pack battery designed not to be attached/detached. However, desirably, the battery 210 according to the second exemplary embodiment of the present general inventive concept may be an internal pack battery.

Figure 6:
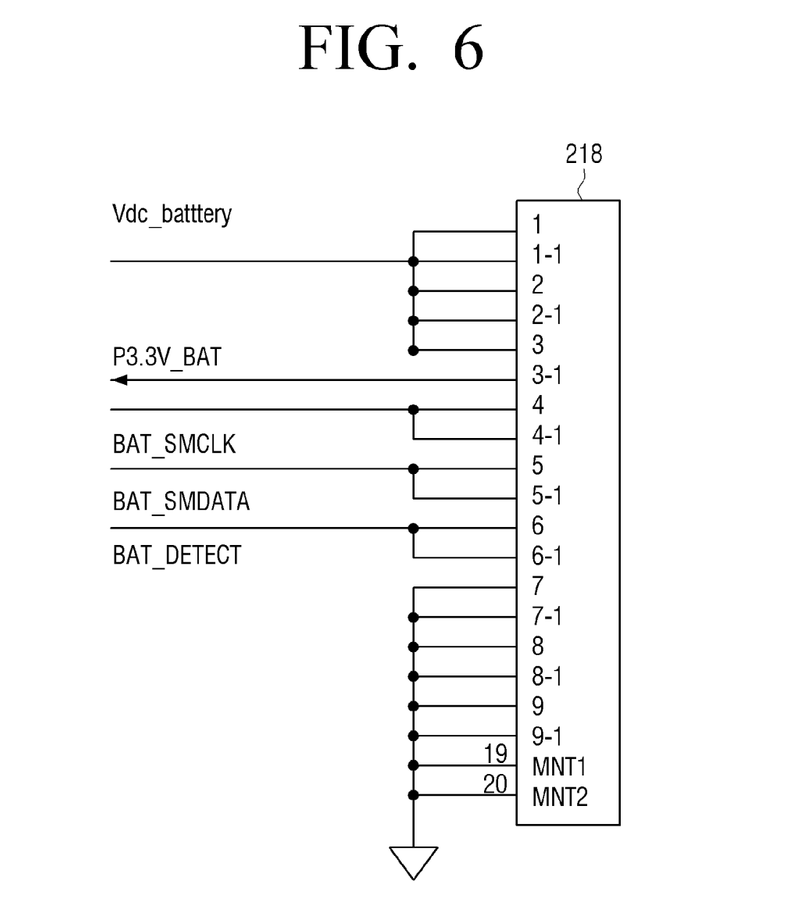
FIG. 6 is a view illustrating a battery connector to which a battery according to FIG. 5 accesses.

FIG. 6 is a view illustrating a battery connector 218 which the battery 210 according to FIG. 5 accesses. Herein, the battery connector 218 is an apparatus provided in the electronic apparatus to access the battery, and may have the same number of terminals 1, 1-1~MINT1, MINT2 as the number of batteries to access the batteries.

Hereinafter is a detailed explanation on the battery 210 according to the second exemplary embodiment of the present general inventive concept with reference to FIGS. 5 and 6.

The battery cell 211 is a cell which may be used repeatedly through a process of charging where chemical energy is converted into electrical energy and discharging where electrical energy is converted into chemical energy. Accordingly, the battery cell 211 may supply charged DC power.

The first power terminal 212 is a terminal which supplies main power (Vdc_battery) to the electronic apparatus. Herein, the first power terminal 212 may consist of at least one terminal. In a case where the first power terminal 212 consists of a plurality of terminals, each of the plurality of terminals may access 1, 1-1, 2, 2-1, 3 terminals of the battery connector 218.

The second power terminal 213 is a terminal to supply power P3.3V_BAT for use in the RT/CMOS DATA logic unit 156 which stores Real-Time Clock information and CMOS information. Herein, the second power terminal 212 may be connected to at least one battery cell 211, and receive power (P3.3V_BAT) for use in the RT/CMOS DATA logic unit 156 from at least one battery cell 211.

That is, the second power terminal 213 may receive power (P3.3V_BAT) for use in the RT/CMOS DATA logic unit 156 regardless of on/off of the main power (Vdc_battery) regarding the electronic apparatus.

Such a second power terminal 212 may consist of at least one terminal. If the second power terminal 213 consists of one terminal, the one terminal may access 3-1 terminal of the battery connector 218, as illustrated in FIG. 6.

The signal terminal 214 is a terminal used for performing data communication (BAT_SMCLK, BAT_SMDATA, BAT_DETECT) between the battery 110 and the electronic apparatus. Herein, the signal terminal 214 may consist of at least one terminal. In a case where the signal terminal 214 consists of a plurality of terminals, each of the plurality of terminals may access 4, 4-1, 5, 5-1, 6, 6-1 terminals of the battery connector 218.

An earthing terminal (not illustrated) is a terminal for grounding the battery. Herein, the earthing terminal (not illustrated) may consist of at least one terminal. If the earthing terminal (not illustrated) consists of a plurality of terminals, each of the plurality of terminals may access 7, 7-1, 8, 8-1, 9, 9-1, MNT1, MNT2 terminals of the battery connector 218.

The switching device 216 performs switching operations according to a control of the battery manager 217 to be explained below. Herein, the switching device 216 may be embodied as a MOSFET which performs switching operations.

The battery manager 217 may control the switching device 216 to control supply of main power through the first power terminal 212. More specifically, when main power should be supplied, the battery manager 217 may control the switching device 216 to supply main power through the first power terminal 212.

In addition, when main power need not be supplied, the battery manager 217 may control the switching device 216 so that main power is not supplied through the first power terminal 212.

In addition, the battery manager 217 may control the switching device 216 so that the battery performs data communication with the electronic apparatus through the signal terminal 214. Such data communication between the battery 210 and the electronic apparatus may be performed using the I2C (Inter Integrated Circuit) communication method.

In a case of using a battery according to the second exemplary embodiment of the present general inventive concept as aforementioned, it is unnecessary to provide an additional circuit configuration (two diodes and signal lines according thereto) such as in FIG. 4 which configures the power supply controller 120, but it is possible to have an additional line which connects the second power terminal 213 and the RT/CMOS DATA logic unit 156 to embody the electronic apparatus 400.

In addition, it is possible to remove the requirement of an additional battery for supplying power to the RT/CMOS DATA logic unit and a connector of the additional battery for supplying power to the RT/CMOS DATA logic unit by supplying power to the RT/CMOS DATA logic unit using the battery supplying main power to the electronic apparatus. Accordingly, it is possible to achieve saving effect of material costs and saving effect of space.

Figure 7:
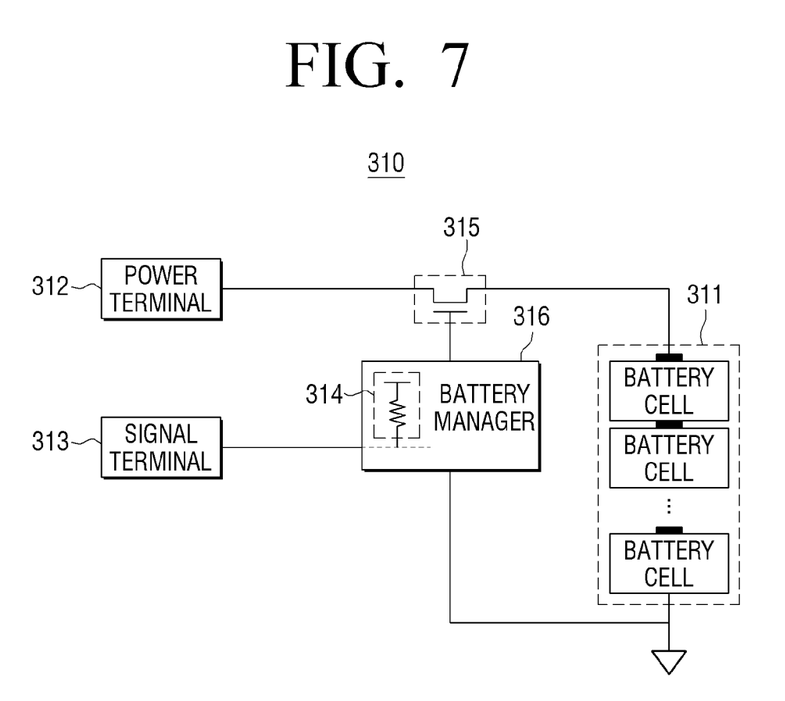
FIG. 7 is a block diagram illustrating a battery according to a third exemplary embodiment of the present general inventive concept.

FIG. 7 is a block diagram illustrating a battery 310 according to a third exemplary embodiment of the present general inventive concept. With reference to FIG. 7, the battery 310 according to the third exemplary embodiment of the present general inventive concept includes at least one of an entire or portion of battery cell 311, power terminal 312, signal terminal 313, pull up resistance 314, switching device 315, and battery manager 316. Herein, the battery 310 according to the third exemplary embodiment of the present general inventive concept has a difference that the pull up resistance 314 is provided within the battery manager 316. Herein, the resistance 314 may be designed inside the battery manager 316 as an ASIC (Application Specific Integrated Circuit).

However, the battery 310 according to the third exemplary embodiment of the present general inventive concept is identical to the battery 310 of the first exemplary embodiment of the present general inventive concept in terms of operation besides the differences in terms of each embodiment. Therefore, specific explanation thereof is omitted.

Figure 8:
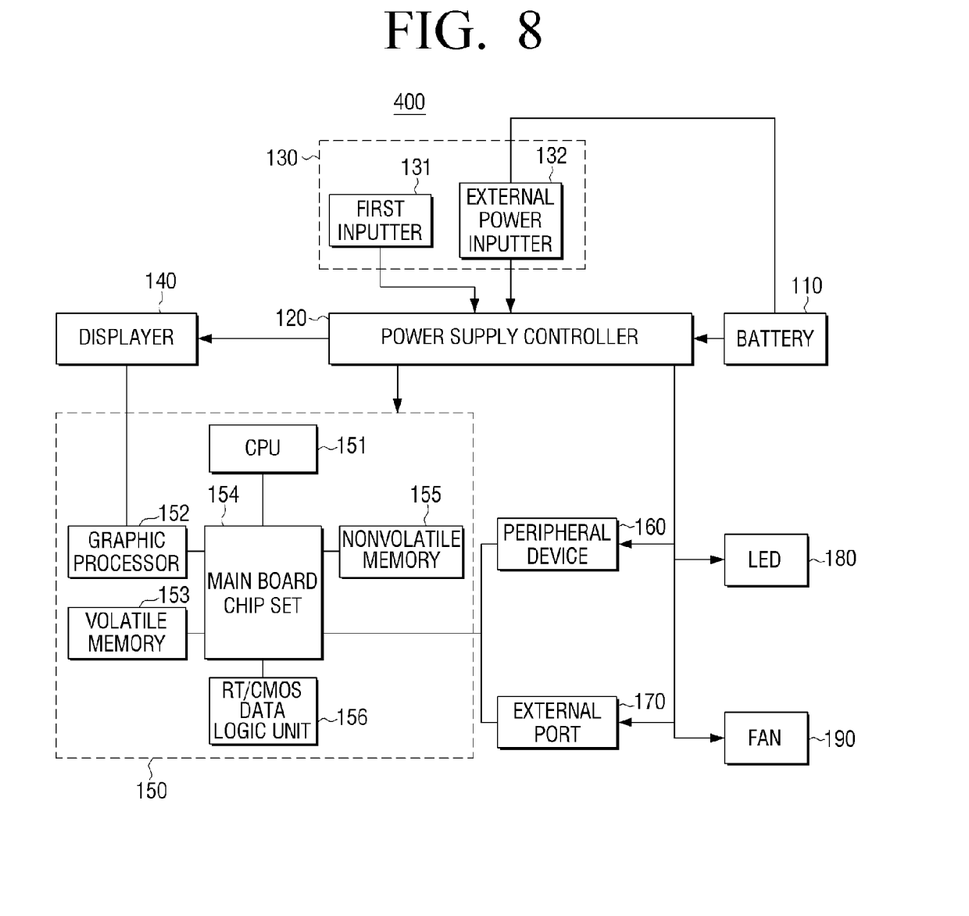
FIG. 8 is a block diagram specifically illustrating an electronic apparatus according to various exemplary embodiments of the present general inventive concept.

FIG. 8 is a block diagram specifically illustrating an electronic apparatus 400 according to various exemplary embodiments of the present general inventive concept. With reference to FIG. 8, the electronic apparatus 400 may include at least one of an entire or portion of a battery 110, power supply controller 120, inputter 130, displayer 140, controller 150, peripheral apparatus 160, external port 170, light emitting diode (LED) 180, and fan 190.

Herein, the inputter 130 may include at least one of an entire or portion of a first inputter 131, and an external power inputter 132. In addition, the controller 150 may include an entire or portion of a CPU 151, graphic processor 152, volatile memory 153, main board chip set 154, nonvolatile memory 155, and RT/CMOS DATA logic unit 156.

Meanwhile, the electronic apparatus 400 may be a portable electronic apparatus such as a notebook computer, tablet computer, and smart phone.

The battery 110 may be embodied as a battery according to the aforementioned first or third exemplary embodiment of the present general inventive concept.

The inputter 130 receives a user input regarding the electronic apparatus 400. Herein, the inputter 130 may include a first inputter 131 and an external power inputter 132.

The first inputter 131 may be placed on one area of the electronic apparatus 100, and receive a user input which powers on the electronic apparatus 400. Herein, the first inputter 131 may be embodied in various methods such as a button method or touch method etc.

The external power inputter 132 may receive power supplied from an external power source (not shown). In addition, the external power inputter 132 may determine whether to receive the user input of accessing external power to the electronic apparatus 400 according to whether power is provided from the external power source. Herein, external power may be an external AC adaptor which supplies power to the electronic apparatus 400. Meanwhile, when external power is provided, the electronic apparatus 400 may operate using the provided external power.

The displayer 140 performs a function of displaying a screen.

Herein, the displayer 140 may be embodied as at least one of a liquid crystal display, thin film transistor-liquid crystal display, organic light-emitting diode, flexible display, 3-dimensional display, and transparent display.

The peripheral apparatus 160 may include various apparatuses such as an HDD (Hard Disk Drive), sound card, and LAN card etc. that accesses the electronic apparatus 400 through a connector such as a main board chip set 154.

The external port 170 may include various ports such as a USB (Universal Serial Bus) port, HDMI (High-Definition Multimedia Interface), and 1394 port, which is a general term in the computer field, provided in the main board chip set 154.

The LED 180 may perform a function of displaying a state of the electronic apparatus 400, and may be placed on one area of the electronic apparatus 400 so as to be seen by the user's eyes. For example, the LED 180 may display the power-on state, and operation states of HDD in various colors. Herein, one or more LEDs may be embodied.

The fan 190 may be a thermal fan used for cooling the electronic apparatus 400.

The power supply controller 120 controls power supply regarding all components configuring the CPU (Central Processing Unit) 151, volatile memory 153, nonvolatile memory 155, main board chip set 154, and RT/CMOS DATA logic unit 156 etc. Especially, the power supply controller 120 may control power supply regarding the RT/CMOS DATA logic unit 156 using the power supplied from the battery 110.

Such a power supply controller 120 may be embodied as a conventional embedded controller including the circuit diagram 120 illustrated in FIG. 4. Specific explanation of the power supply controller 120 has been made hereinabove, and thus further explanation is omitted.

The controller 150 controls the overall operations of the electronic apparatus 400. Especially, the controller 150 may perform a booting operation when the electronic apparatus 400 is powered on. More specifically, the CPU 151 may load the BIOS stored in the nonvolatile memory 155 to the volatile memory 153, and execute the loaded BIOS, to perform a booting operation.

In this case, the booting operation may be performed as the CPU is controlled to initialize the entire storage space of the volatile memory 153, and to initialize all configurations necessary for the electronic apparatus 400 to be powered on and operate.

Meanwhile, when a booting operation is completed, the controller 150 may execute an operation system, and control the displayer 140 to display an operation system execution screen.

Meanwhile, in a case where the battery 210, according to the second exemplary embodiment of the present general inventive concept, is embodied within the electronic apparatus 400 of FIG. 8, an additional circuit configuration (two diodes and a signal line according thereto) which configures the power supply controller 120 as illustrated in FIG. 4 is not necessary, and, therefore, it is possible to embody the electronic apparatus 400 by providing an additional line which connects the second power terminal 213 to the RT/CMOS DATA logic unit.

In addition, regarding FIG. 8, it has been explained that the RT/CMOS DATA logic unit 156 is embodied as an additional single chip, but it is not limited thereto, and thus the RT/CMOS DATA logic unit 156 may be embodied as one of the function blocks inside ASIC (Application Specific Integrated Circuit).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus comprising:
   an RT/CMOS DATA logic unit to store Real-Time Clock information and CMOS information; and
   a battery including a power terminal to supply main power used in the electronic apparatus and a signal terminal for data communication with the electronic apparatus, and, when the main power is turned off, the battery supplies power to the RT/CMOS DATA logic unit through the signal terminal to maintain operations of the RT/CMOS DATA logic unit.

2. The electronic apparatus according to claim 1, further comprising a power supply controller to enable power supplied from the power terminal or the signal terminal to be provided to the RT/CMOS DATA logic unit, according to on/off state of the main power.

3. The electronic apparatus according to claim 2, wherein the power supply controller provides the power supplied from the signal terminal to the RT/CMOS DATA logic unit when the main power is turned off, and provides the power supplied from the power terminal to the RT/CMOS DATA logic unit when the main power is turned on.

4. The electronic apparatus according to claim 3, wherein the power supply controller comprises:
   a first diode of which an anode end is connected to a line connected to the signal terminal and of which a cathode end is connected to a line connected to the RT/CMOS DATA logic unit; and
   a second diode of which an anode end is connected to a line connected to the power terminal and of which a cathode end is connected to a line connected to the RT/CMOS DATA logic unit.

5. The electronic apparatus according to claim 1, wherein the battery further comprises:
   at least one battery cell;
   a pull up resistance to provide power supplied from the at least one battery cell to the signal terminal;
   a switching device connected to the at least one battery cell; and
   a battery manager to control the switching device to control supply of main power through the power terminal, and controls the switching device to supply power to the RT/CMOS DATA logic unit through the signal terminal or to perform the data communication.

6. The electronic apparatus according to claim 5, wherein the resistance is characterized to be provided inside the battery manager.

7. The electronic apparatus according to claim 1, wherein the battery is characterized to be an internal pack battery.

8. The electronic apparatus according to claim 1, wherein data communication between the battery and the electronic apparatus is performed using an I2C (Inter Integrated Circuit) communication method.

9. A battery used in an electronic apparatus, the battery comprising:
   at least one battery cell;
   a power terminal to supply main power to the electronic apparatus;
   a signal terminal to perform data communication between the battery and the electronic apparatus or to supply power to an RT/CMOS DATA logic unit which stores Real-Time Clock information and CMOS information;
   a pull up resistance to provide power supplied from the at least one battery cell to the signal terminal; and
   a battery manager to supply power to the RT/CMOS DATA logic unit through the signal terminal when the main power is turned off, and to perform data communication between the battery and the electronic apparatus through the signal terminal when the main power is turned on.

10. The battery according to claim 9, wherein the resistance is characterized to be provided inside the battery manager.

11. A battery usable in an electronic apparatus, the battery comprising:
    at least one battery cell;
    a first power terminal to supply main power to the electronic apparatus; and
    a second power terminal to supply power to an RT/CMOS DATA logic unit which stores Real-Time Clock information and CMOS information,
    wherein the second terminal is a terminal which supplies power to the RT/CMOS DATA logic unit to maintain operations of the RT/CMOS DATA logic unit regardless of on/off state of the main power.

12. A power supply apparatus to supply power to an RT/CMOS DATA logic unit which stores Real-Time Clock information and CMOS information, the power supply apparatus comprising:
    a battery to store power; and
    a power supply controller to control power supply to the RT/CMOS DATA logic unit, using power supplied from the battery,
    wherein the battery comprises:
       a signal terminal to perform data communication between the battery and the electronic apparatus or to supply power to the RT/CMOS DATA logic unit; and
       a power terminal to supply main power to the electronic apparatus, and the power supply controller enables power supplied from the power terminal or the signal terminal to be provided to the RT/CMOS DATA logic unit, according to on/off state of the main power.

13. The power supply apparatus according to claim 12, wherein the power supply controller provides the power supplied from the signal terminal to the RT/CMOS DATA logic unit when the main power is turned off, and provides the power supplied from the power terminal to the RT/CMOS DATA logic unit when the main power is turned on.

14. An electronic apparatus, comprising:
    a battery having a power terminal to output a main power, and a signal terminal to selectively output data and a sub-power.

15. The electronic apparatus according to claim 14, wherein the battery further comprises one or more battery cells to generate a battery power, and a voltage level reducer to reduce a voltage level of the battery power to output the sub-power.

16. The electronic apparatus according to claim 14, wherein the battery further comprises one or more battery cells to generate a battery power such that the one or more battery cells are selectively connected to either the power terminal or the signal terminal.

17. The electronic apparatus according to claim 14, wherein the battery further comprises a battery manager to selectively supply the main power to the power terminal and the sub-power to the signal terminal.

18. The electronic apparatus according to claim 14, wherein the battery exclusively outputs one of the data and the sub-power.

19. The electronic apparatus according to claim 14, wherein the battery exclusively outputs one of the main power and the sub-power.

20. The electronic apparatus according to claim 14, wherein the battery simultaneously outputs the main power and the data.

* * * * *